L. S. LACHMAN.
ELECTRIC WELDING APPARATUS.
APPLICATION FILED APR. 18, 1914.

1,123,558.

Patented Jan. 5, 1915.
2 SHEETS—SHEET 1.

WITNESSES

INVENTOR
Laurence S. Lachman.
BY
ATTORNEYS

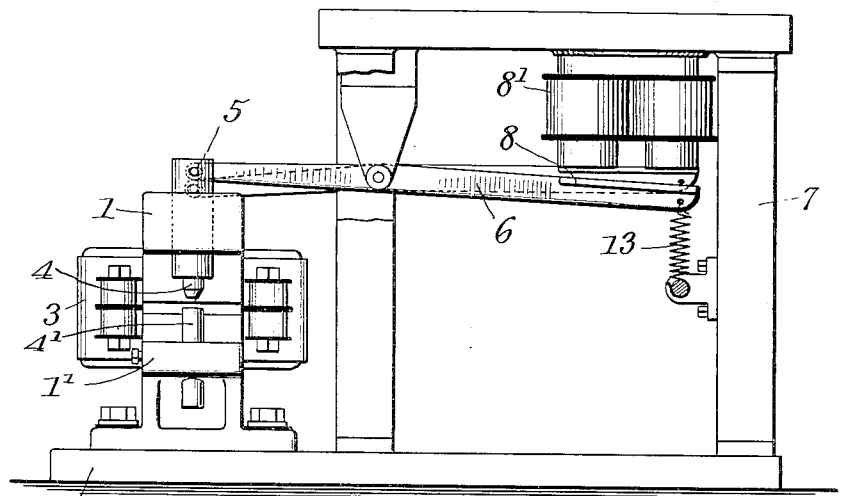
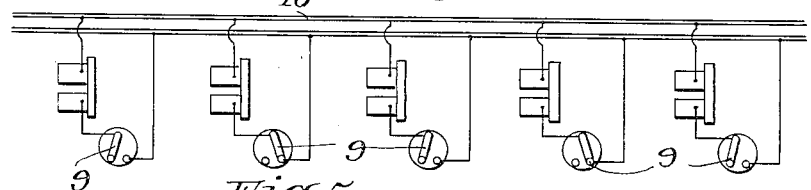
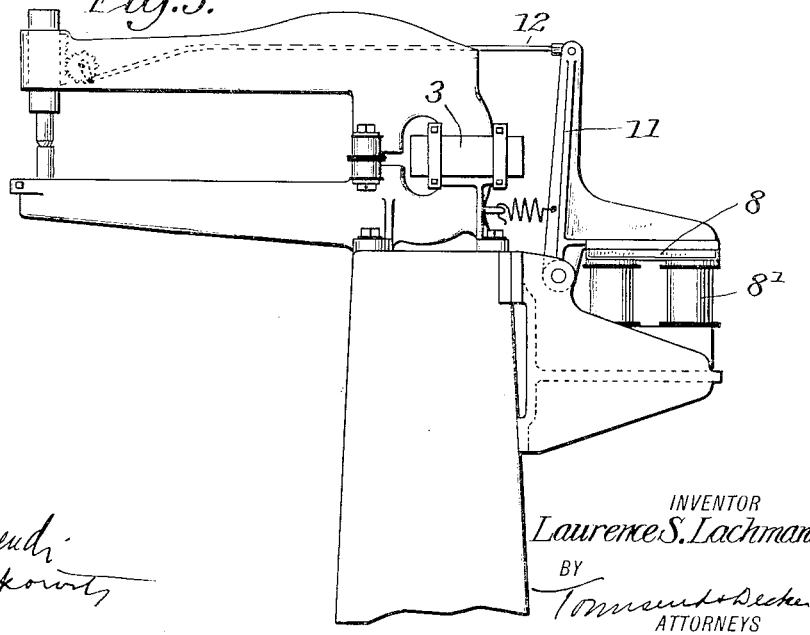

UNITED STATES PATENT OFFICE.

LAURENCE S. LACHMAN, OF NEW YORK, N. Y., ASSIGNOR TO UNIVERSAL ELECTRIC WELDING COMPANY, OF NEW YORK, N. Y., A CORPORATION OF NEW YORK.

ELECTRIC WELDING APPARATUS.

1,123,558.  Specification of Letters Patent.  Patented Jan. 5, 1915.

Application filed April 18, 1914. Serial No. 832,741.

*To all whom it may concern:*

Be it known that I, LAURENCE S. LACHMAN, a citizen of the United States, and a resident of New York, in the county of New York and State of New York, have invented certain new and useful Improvements in Electric Welding Apparatus, of which the following is a specification.

My invention relates to that class of electric welding machines known as spot welding machines and the object of the invention is to improve the construction and operation of the same as well as to facilitate the control of the welding action at the will of the operator, and also to permit the weld to be made at any one or more of a number of points upon the work after it is inserted in the "gap" without shifting the position of the work in said "gap".

A further object is to accomplish these ends without unduly adding to the weight and complication of the apparatus.

To these ends my invention consists in the construction of apparatus and combination of parts hereinafter more particularly described and then specified in the claims.

Figure 1:
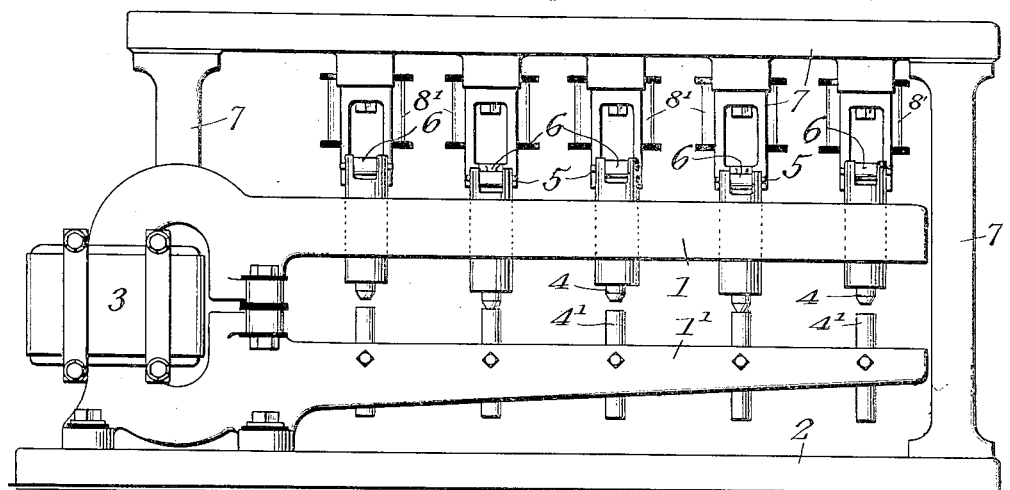
Figure 2:
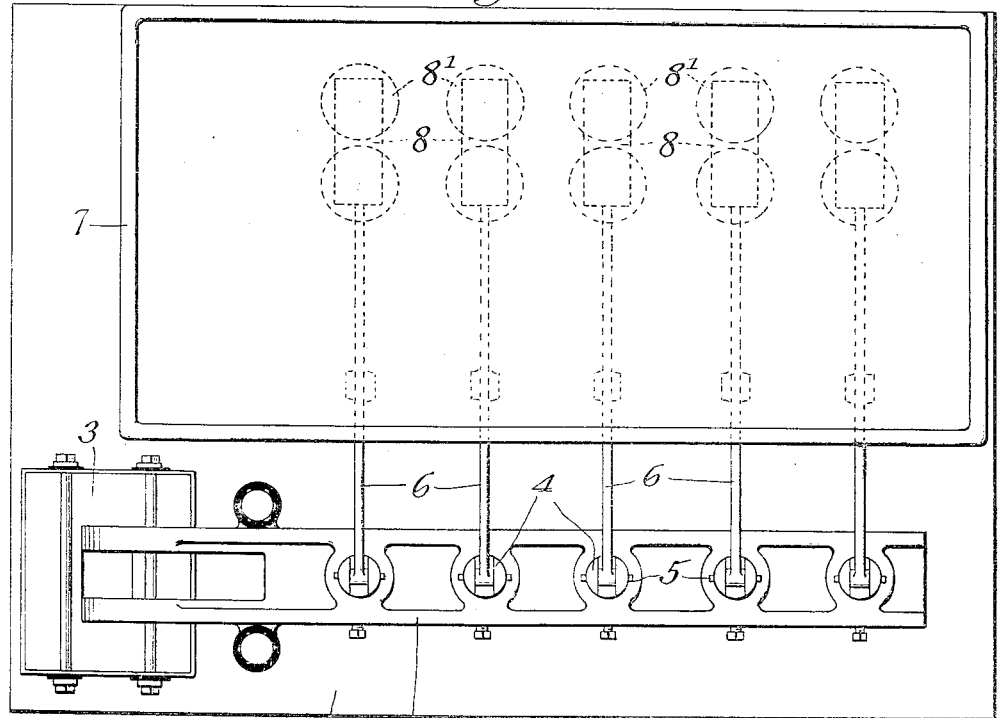

Figure 1 is a side elevation of the form of apparatus embodying my invention. Fig. 2 is a plan of the same. Fig. 3 is a side elevation of the mechanism for actuating an electrode through the application of a motive power agent, such as electricity. Fig. 4 is a diagram of circuits that may be employed when electricity is used as the motive power. Fig. 5 is a side elevation of a modification in the construction of the mechanism that may be used for electrically actuating an electrode of the machine.

1 indicates the upper bar or arm of a spot welding machine and 1' the lower bar thereof, said bars being rigidly supported upon it in the usual manner employed in electrode spot welders and being extended parallel to one another from a suitable base, the top portion of which is indicated at 2. The transformer ordinarily employed in such class of apparatus is indicated in outline at 3, but as this part of the machine and the means for feeding or supplying current to the spot welding electrodes form no particular part of my invention, the same will not be described in further detail.

Pairs of spot welding electrodes, five in number, are shown in the drawings, although a greater or less number may be employed as desired. Two electrodes of each pair are indicated respectively by the numerals 4, 4'. The lower member of each pair is preferably supported in a fixed manner but the upper member of each pair is movably supported in any proper way in the upper rigidly fixed arm or member 1 to enable it to be pressed against or removed from pressure contact with the work inserted in the "gap" between the rigid arms 1, 1'.

Each of the movable electrodes is power-actuated and for this purpose may be connected by a flexible joint or pivot 5 with one end of a lever 6 mounted in a suitable support in a frame 7 carried on the base or table of the apparatus. The opposite end of the said lever is provided with an armature 8 or other means whereby electrical or other power may be applied through the lever to the electrode in the spot welding operation. The electro-magnets, which may be of any desired construction, and of which one is preferably provided for each armature and movable electrode 4, are indicated at 8'. These are also by preference suitably supported or mounted in the frame 7 or top plate thereof, as clearly shown in the drawings.

Means for controlling the application of the motive power agent employed in the form of my invention shown consist of suitable circuit controllers, one preferably for each magnet, said circuit controllers being indicated in the diagram Fig. 4 in conventional manner by the electric switches shown at 9. The motive power may be supplied to the magnets in multiple from mains 10 in obvious manner and the operation of the magnets and their corresponding electrodes is controllable, in an obvious way, by the switches 9 and in such manner that either one or more of the electrodes may be operated to the exclusion of the others by manipulation of the proper controller or controllers 9.

It will also be seen that when the work is inserted in the "gap," the operator may, at will, produce a spot weld at any desired point therein without shifting the position of the work in the "gap" either close to or at a distance from the back of the throat or "gap."

In the construction of apparatus shown, the series of devices such as electro-magnets, employed for actuating the electrodes, are arranged to one side of the arms 1, 1'. Where it is desired, however, to provide the machine with but a single electrode the magnet for actuating the same may be mounted at the back of the arms upon the post or pedestal of the machine, as shown in Fig. 5, and the armature thereof may connect by a bell crank lever 11 and a link 12 extending forward along the upper arm for connection with the movable electrode by any suitable or usual form of device such as indicated, whereby the electrode will be depressed when the magnet is excited.

Suitable springs for withdrawing the electrodes from contact with the work when the application of the motive power ceases, may be applied at any desired point in the construction, as will readily occur to those skilled in the art. Such a spring is indicated at 13 in Fig. 3.

The controlling means 9 may obviously be located at any desired portion of the apparatus or at any desired point where they may be conveniently reached by the operator.

If desired, an automatic switch of the usual construction well known in the art may be used with each electrode for automatically controlling the duration of the flow of welding current when said electrode is actuated.

What I claim as my invention is:—

1. In an electric spot welding apparatus, the combination with a plurality of electrodes movably supported upon a rigid arm of the machine, of an actuating electro-magnet for each electrode and circuit controlling means for controlling the operation of said magnets.

2. An electric spot welding apparatus having a movably mounted power-actuated welding electrode mounted on a rigid arm of the machine in combination with a manual power-controlling device for controlling the application of the motive power agent to the electrode as and for the purpose described.

3. In an electric spot welding apparatus, a pair of rigid arms or members provided with a plurality of electrodes movably supported in one of said arms, means for actuating said electrodes by a motive power agent and means for controlling at will the application of the motive power agent to operate any electrode or electrodes to the exclusion of another.

4. In an electric spot welding apparatus, a rigid arm or bar provided with a series of welding electrodes arranged in line extending outwardly from the bottom of the throat or "gap" and each movably mounted or supported in said arm independently of the others and independent actuating means for said electrodes respectively comprising electro-magnets, one for each electrode.

5. In an electric spot welding apparatus, the combination with a rigid arm or bar and a plurality of movable spot welding electrodes mounted independently of one another in different positions in the "gap" or throat of the machine, and means for actuating each electrode at will by the application of manually controlled motive-power.

6. An electric welding machine comprising a spot welding electrode and electro-magnetic means adapted to actuate said electrode.

7. An electric spot welding apparatus having a movably mounted spot welding electrode mounted on a rigid arm of the machine in combination with an electro-magnet adapted to actuate said electrode and manual means for controlling the actuation of said electro-magnet.

8. In an electric spot welding machine, the combination of a pair of arms projecting from the machine, a plurality of spot welding electrodes movably supported in one of said arms and an actuating electro-magnet for each electrode.

Signed at New York, in the county of New York and State of New York, this 15th day of April, A. D. 1914.

LAURENCE S. LACHMAN.

Witnesses:
F. B. TOWNSEND,
IRENE LEFPOINTS.